Nov. 14, 1950 K. F. ROSS 2,530,081

RECEIVER FOR WAVE LENGTH MODULATED ELECTRIC WAVES

Filed March 28, 1947 6 Sheets-Sheet 1

INVENTOR.
KARL F. ROSS
BY
A. John Michel
ATTORNEY

Nov. 14, 1950 K. F. ROSS 2,530,081

RECEIVER FOR WAVE LENGTH MODULATED ELECTRIC WAVES

Filed March 28, 1947 6 Sheets-Sheet 2

INVENTOR.
KARL F. ROSS
BY
[signature]
ATTORNEY

RECEIVER FOR WAVE LENGTH MODULATED ELECTRIC WAVES

Filed March 28, 1947

INVENTOR.
KARL F. ROSS
BY A. John Michel
ATTORNEY

RECEIVER FOR WAVE LENGTH MODULATED ELECTRIC WAVES

Filed March 28, 1947 6 Sheets-Sheet 4

INVENTOR.
KARL F. ROSS
BY
I. John Mitchell
ATTORNEY

Nov. 14, 1950 K. F. ROSS 2,530,081

RECEIVER FOR WAVE LENGTH MODULATED ELECTRIC WAVES

Filed March 28, 1947 6 Sheets-Sheet 5

INVENTOR.
KARL F. ROSS
BY
A. John Michel
ATTORNEY

Nov. 14, 1950 K. F. ROSS 2,530,081

RECEIVER FOR WAVE LENGTH MODULATED ELECTRIC WAVES

Filed March 28, 1947 6 Sheets-Sheet 6

INVENTOR.
KARL F. ROSS
BY
A. John Michel
ATTORNEY

Patented Nov. 14, 1950

2,530,081

UNITED STATES PATENT OFFICE 2,530,081

RECEIVER FOR WAVE-LENGTH MODULATED ELECTRIC WAVES

Karl F. Ross, Bronx, N. Y.

Application March 28, 1947, Serial No. 737,907

16 Claims. (Cl. 250—27)

The present invention relates to a receiver for wave-length modulated electric waves. As distinct from amplitude modulation, the term "wave-length modulation" denotes such systems where intelligence is transmitted by varying either the frequency or the phase of a basic or carrier wave, and is also intended to include systems where signaling is effected by the transmission of trains of non-sinusoidal pulses of varying duration or spacing. A signal of the latter type may be produced, for instance, by the successive opening and closing of a line circuit.

The more common demodulating arrangements within the above category, suitable for the reception of frequency and (with adaptations) phase modulated carrier waves, employ a discriminator capable of producing a potential which varies with the deviation of the carrier frequency from that of a tuned circuit. The chief drawback with these arrangements is that reasonable efficiency of operation is obtained only for frequencies varying rather closely about the resonant frequency of the tuned circuit, and the prevention of drifts of the mean frequency presents a serious problem at the transmitting end of such systems.

It is an important object of the present invention to provide, in a receiver for electromagnetic waves, means for discriminating between frequencies covering a relatively wide range, the stability of the mean frequency not being critical.

Another object of my invention is to provide, in a receiver of the type set forth, means for deriving from an incoming wave a potential varying in magnitude with the absolute value of the frequency of the wave.

A further object of the invention is to provide a receiver for wave-length modulated waves in which the energy of the incoming wave is utilized only for the production of pulses to synchronize a local generator of voltage waves.

It has been proposed to derive from an incoming carrier wave pulses of uniform amplitude, the number of pulses per unit of time being representative of the number of cycles within the same period, and to apply these pulses to an integrating network so as to develop a potential depending on the frequency of the wave. Such an arrangement is quite susceptible to distortion as a result of interferences from atmospheric or other sources tending to suppress occasional cycles of the carrier wave, and it is therefore another object of my invention to minimize the effect of such interferences by providing, in a receiver, means for producing pulses varying in amplitude as well as in frequency of occurrence with the frequency of the incoming wave.

More particularly, it is an object of this invention to provide means for producing a train of potentials each of which is representative of the instantaneous value of the frequency of the incoming modulated wave.

A further, more specific object of my invention is to provide receiving means responsive to voice frequency signaling, as used in automatic telephony, designed to obviate the need for employing elaborate filter systems.

Yet another, more specific object of the present invention is to provide a discriminator for phase modulated waves which does not require the simultaneous transmission of an unmodulated pilot wave.

Other and further objects will subsequently appear.

In accordance with the invention, I derive from the incoming modulated wave a series of trigger pulses used to trip a normally inactive sawtooth voltage generator comprising electronic or ionic discharge means, each pulse causing it to produce a single sawtooth. The width and amplitude of the sawtooth impulses decrease with rising frequency, and the resulting wave is a sawtooth modulated by the signal and has an envelope which can be detected. The trigger pulses may be obtained by any known differentiation process from the basic (e. g. sinusoidal carrier) wave, each cycle thereof being arranged to yield either one or two pulses depending on whether half-wave or full-wave rectification be used.

In another form of the invention a more desirable wave form may be produced by deriving from the incoming wave a second set of pulses alternating with the trigger pulses for the purpose of registering the voltage of the sawtooth generator, at the instant of occurrence of the second pulse, on a storing device such as a condenser. By suitably inverting the sawtooth wave it is possible to obtain an output in the form of pulses whose amplitudes and cadence (i. e. frequency of occurrence) varies directly with the frequency of the basic wave, thus affording more efficient discrimination.

In a further modification, I use the trigger and registering pulses to produce an output in the form of a train of triangular pulses and then, by reversing the functions of the two pulses, produce a similar train 180 degrees out of phase with the first one. By suitably combining the two impulse trains I may obtain an output wave which closely resembles the signal with which the basic wave had been modulated.

It should be pointed out here that the term "basic wave" is not confined to radio frequency carriers received over an antenna but also includes frequency, phase or pulse modulated waves transmitted by way of a line circuit as well as low-frequency waves modulated in that manner which may in turn have been superimposed upon a high frequency carrier and detected by ordinary amplitude demodulating means. The basic wave may be audio frequency modulated, it may be a train of marking and spacing or dot-and-dash impulses, or it may have the form of a continuous wave of a characteristic frequency to give a desired indication or to perform a certain function.

If the input is in the form of a substantially sinusoidal alternating wave, the two types of pulses may be derived therefrom by means of two half-wave rectifiers and associated differentiation circuits, and will have their leading edges coincide with a change of sign of the incoming wave. Where the modulated wave consists of a train of rectangular pluses, a trigger pulse and a registering pulse of opposite polarity may be derived therefrom by means of simple differentiation, e. g. via an input transformer. In the simplest case the input may already consist of alternately positive and negative impulses received over a line circuit, the spacing between the impulses of each pair being characteristic of the intelligence transmitted.

According to a further feature of the invention a condenser used for storing the signal voltages may be charged through a rectifier, and may have a discharge path which is blocked during the potential build-up and which may be unblocked in a suitably determined manner. Thus the condenser may be allowed to discharge during the second half of each cycle of the basic wave, e. g. if the latter is audio frequency modulated, or at the end of a wave train of constant frequency, as in voice frequency signaling, or else after the receiver has performed a desired function associated with the particular signal.

According to still another feature of the invention, phase discrimination may be accomplished by comparing the instantaneous value of the signal potential, obtained in the aforedescribed manner, with a normal voltage existing in the absence of signal modulation. The differential voltage is then applied to a voltage accumulator which may comprise a condenser adapted to be charged in one sense through a first circuit containing electronic discharge means and in the other sense through a second circuit likewise containing electronic discharge means, whereby the magnitude and polarity of the charge on the condenser will vary in accordance with the instantaneous phase of the basic wave.

The invention will be more clearly understood from the following detailed description, taken in conjunction with the accompanying drawing in which—

Figure 7:
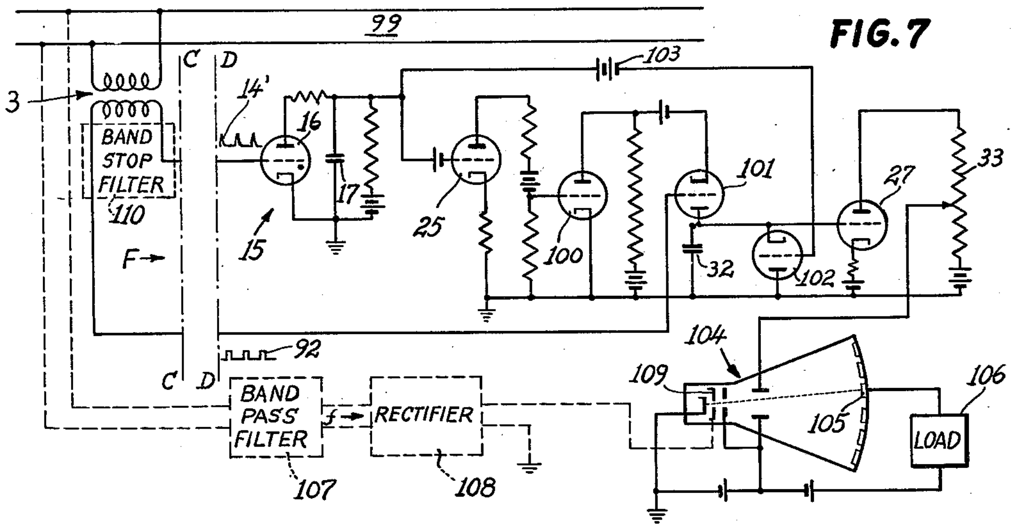
Figure 9:
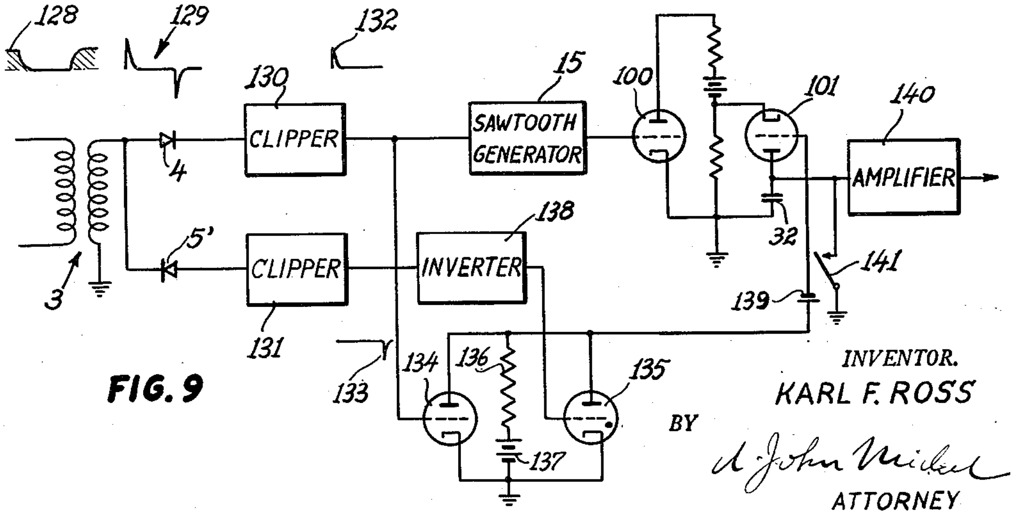
Figures 5A, 11:
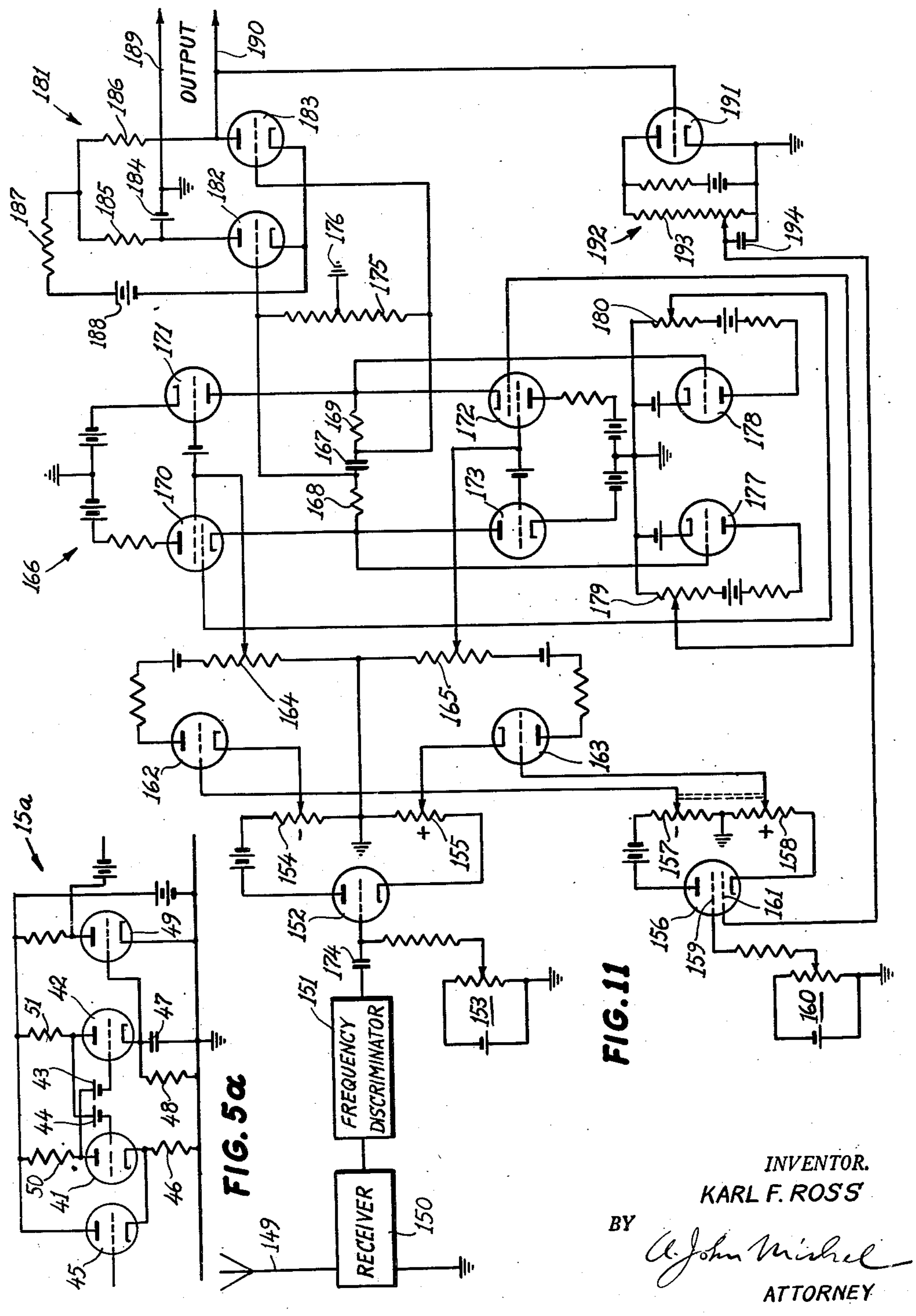
Fig. 5 illustrates another embodiment of the invention.
Figures 4, 5, 5B:
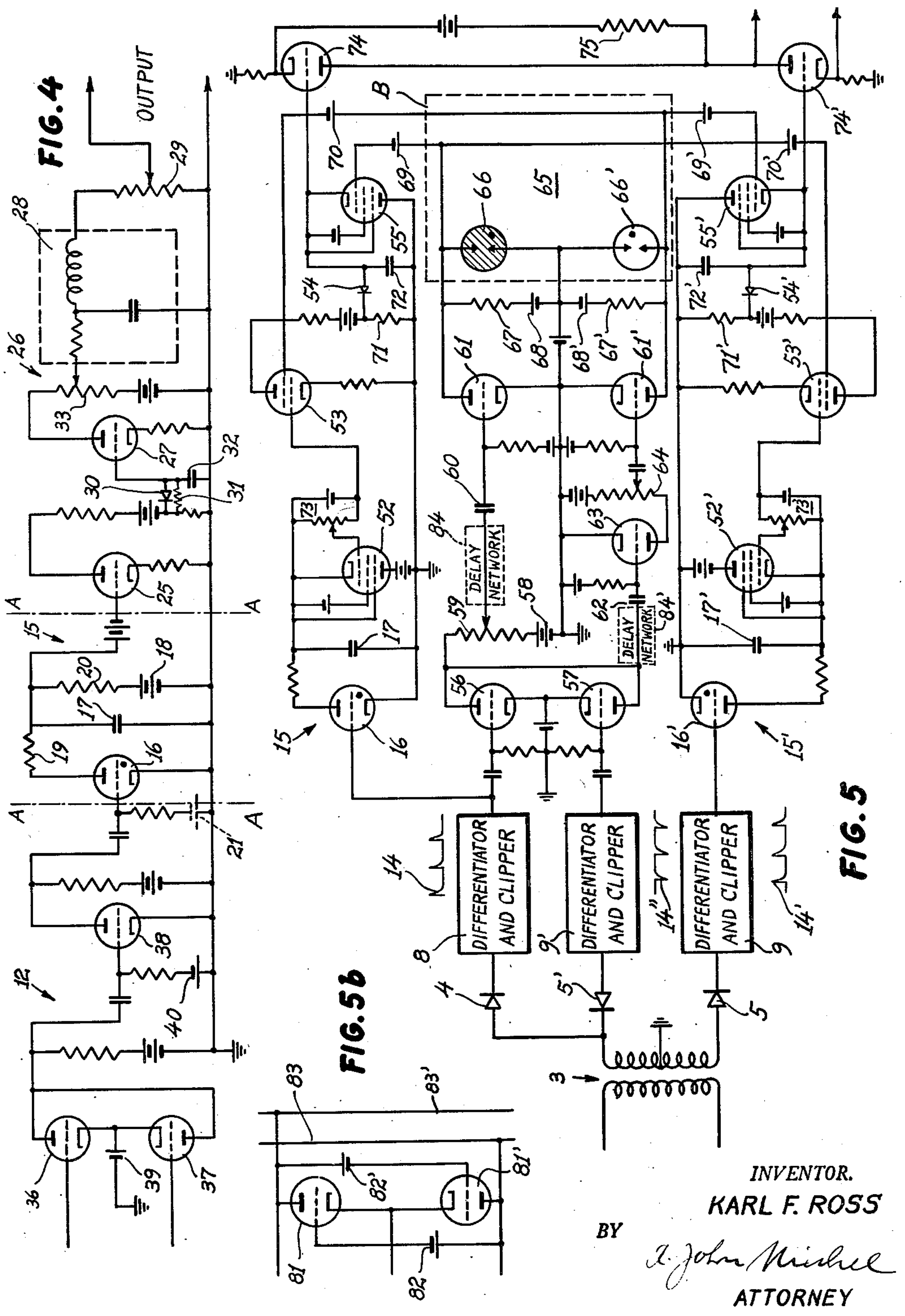
Fig. 4 shows one form of realization of the system of Fig. 3.
Figure 6:
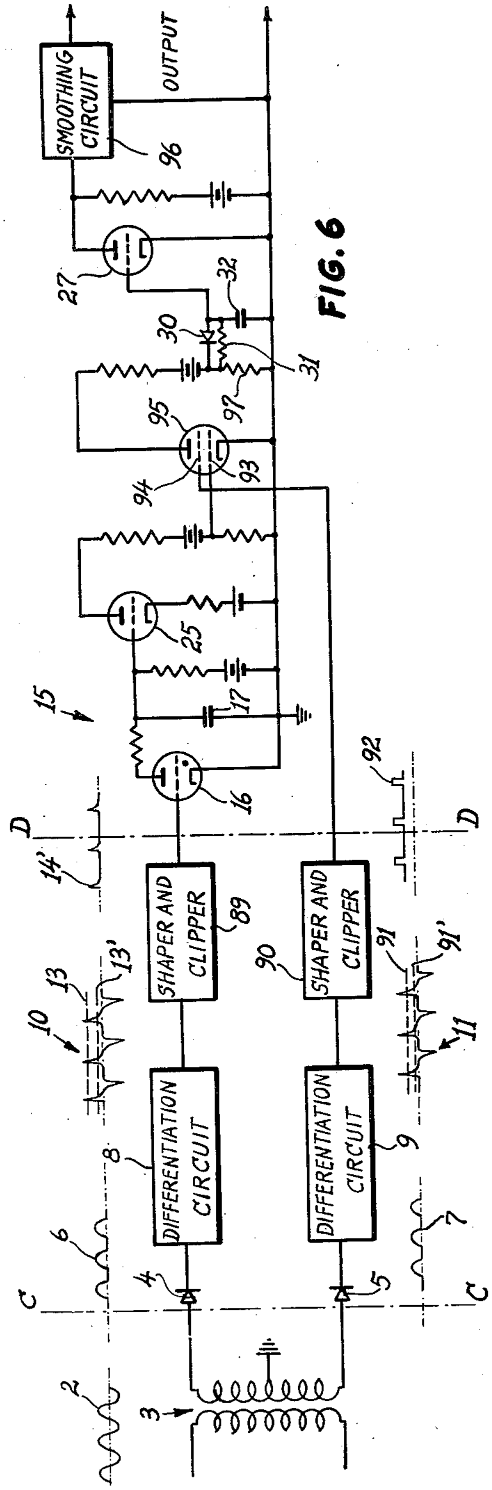
Figure 8:
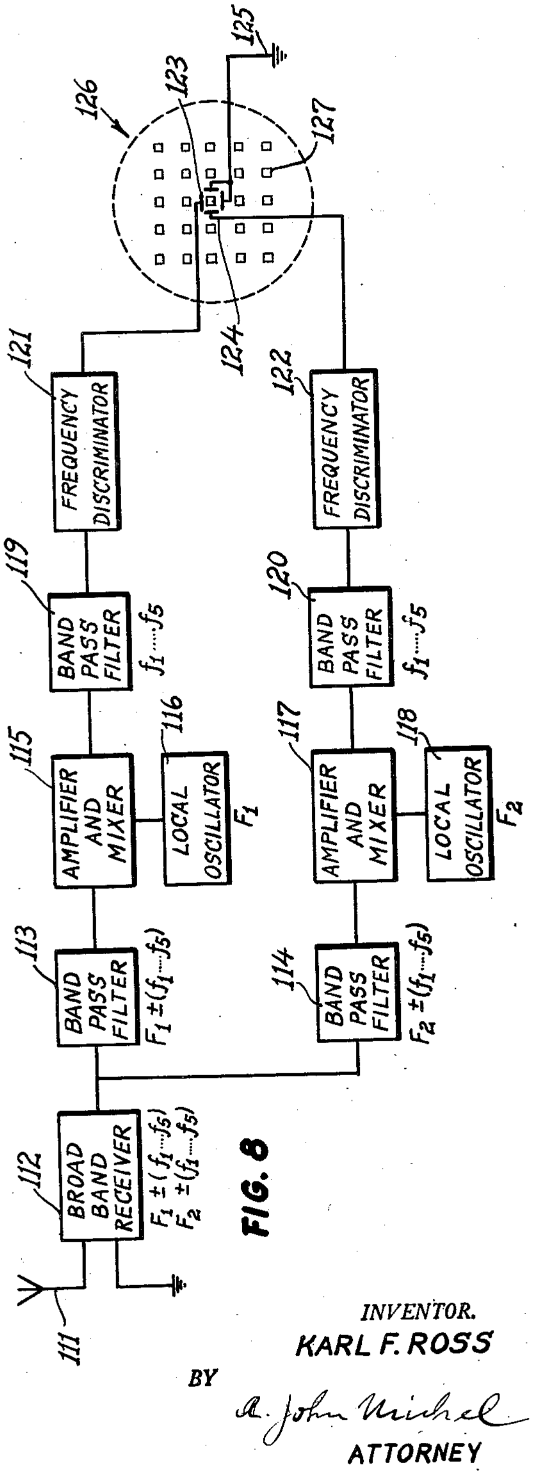

Fig. 5*a* shows a modification of the sawtooth generator used in the arrangements of Figs. 4 and 5;

Fig. 5*b* shows a modification of the gating circuit used in the arrangement of Fig. 5;

Fig. 6 illustrates yet another embodiment of the invention;

Fig. 7 shows how the system of Fig. 6 may be applied to voice frequency signaling;

Fig. 8 illustrates the application of a frequency discriminator, according to the invention, to the transmission of code signals;

Fig. 9 shows how the invention may be adapted to automatic switching systems of the type used in telephone circuits.

Figure 10:
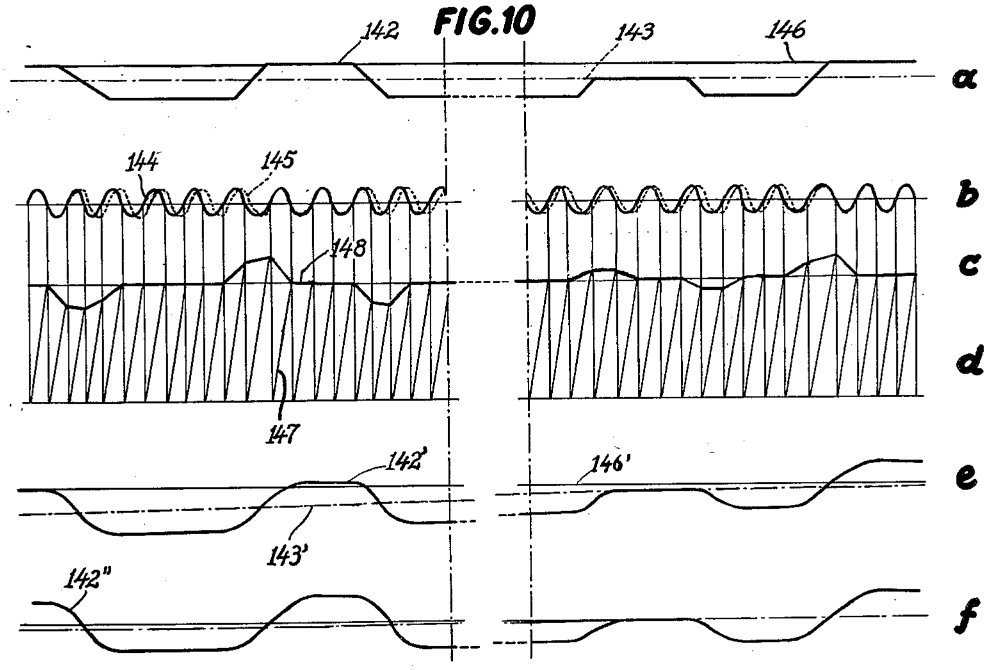
Figure 12:
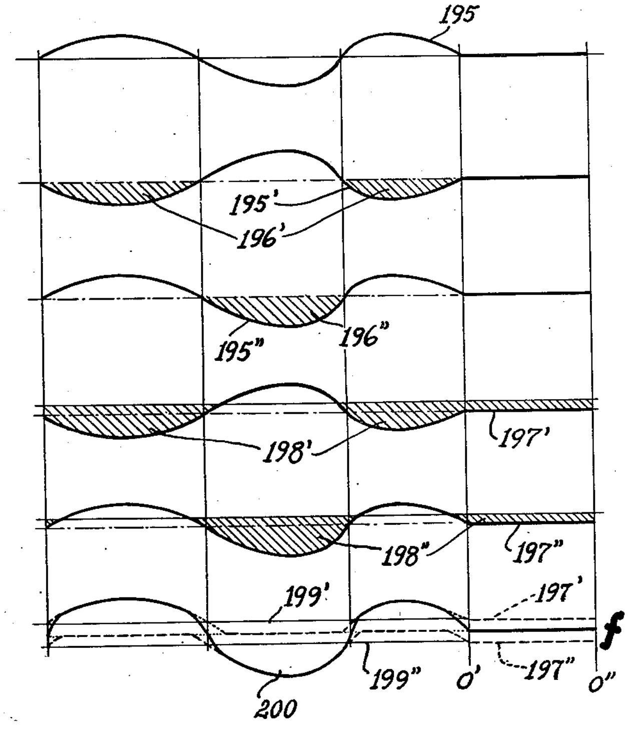

Fig. 10 is a graph explaining the adaptation of the invention for phase discrimination;

Fig. 11 shows a phase discriminating network according to the invention;

Fig. 12 is a graph illustrating certain details of operation of the phase discriminating network shown in Fig. 11.

Figure 1:
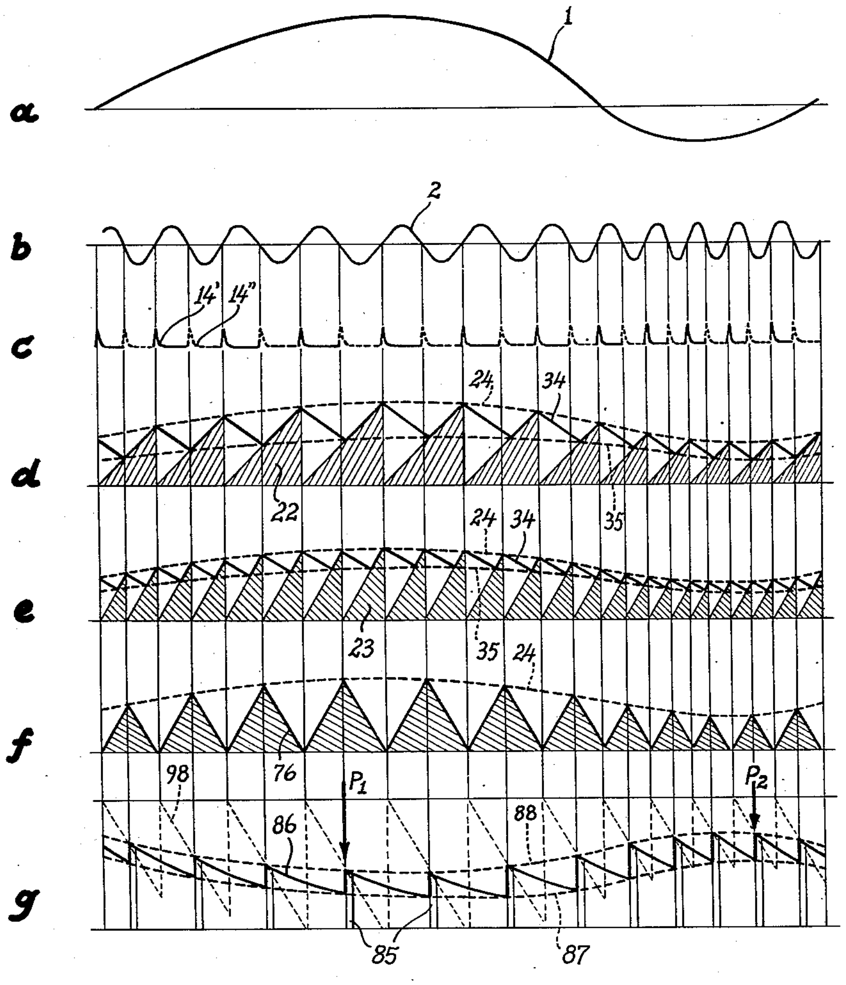
Fig. 1 is a graph to assist in the explanation of the basic principles of the invention.

In Fig. 1 there is shown at *a* a signal wave 1 of arbitrary shape, the unsymmetrical wave form shown having been selected merely for convenience of illustration. The wave 2 reproduced at *b* is a carrier wave which has been frequency modulated in known manner according to the signal wave 1; thus it will be seen that cycles corresponding to positive amplitudes of signal wave 1 are of lower frequency than those corresponding to negative amplitudes of that wave.

Figure 3:
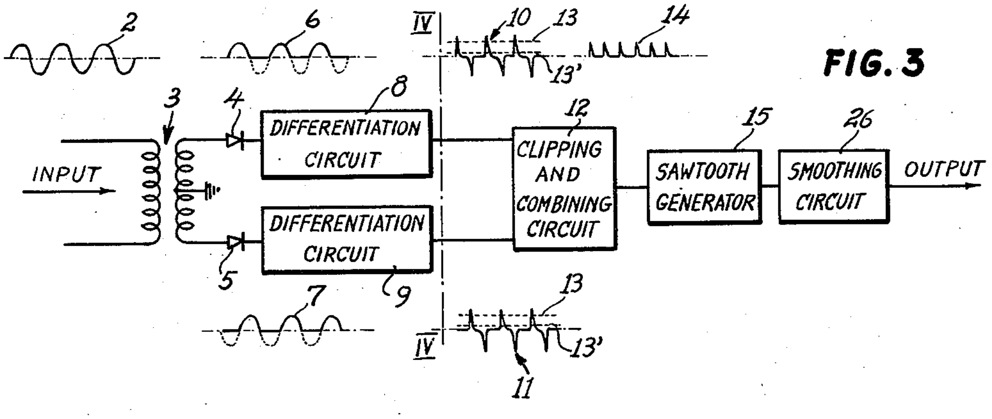
Fig. 3 is a block schematic diagram showing one embodiment of the invention.

Referring to Fig. 3, it will be seen that the frequency modulated wave 2 is applied to the primary of an input transformer 3 having its secondary grounded at the center; opposite terminals of the secondary are connected to two half-wave rectifiers, 4 and 5 respectively, serving to suppress the negative half-cycles of a pair of wave trains 6 and 7 which correspond to the wave 2 but are displaced by 180 degrees from each other. The wave trains 6 and 7 are now applied to respective differentiation circuits 8 and 9 where they give rise to impulse trains 10 and 11, the latter passing subsequently through the clipping and combining circuit 12. The circuits shown at 8, 9 and 12 may be of any type well known in the art and, by themselves, do not form part of the present invention.

The circuit 12 serves to clip the pulses 10 and 11 between the levels 13, 13' and has an output in the form of pulse train 14, successive pulses being spaced at intervals equal to the corresponding half periods of basic wave 2. This can be seen clearly from Fig. 1, where the pulse train 14 is shown at *c* as being composed of full line pulses 14' alternating with dotted-line pulses 14''. Pulses 14' are derived from the train 10 representing the output of differentiation circuit 8, while pulses 14'' are similarly obtained from differentiation circuit 9.

The pulses obtained from the circuit 12 are next applied to a sawtooth generator 15 which may be adjusted so as to be normally inactive or to have an operating frequency which, in the absence of trigger pulses, is lower than the lowest frequency of occurrence of the pulses 14. In Fig. 4, which is a detailed circuit arrangement of the part of Fig. 3 to the right of line IV—IV, I have shown the generator 15 to comprise a thyratron 16, a condenser 17, a source of direct current represented by a battery 18, a current limiting resistor 19 and a charging resistor 20. Preferably the voltage of battery 18 is selected so that the tube 16 will not become conducting as long as the potential on the grid of that tube is substantially below that corresponding to the peaks of pulses 14, a source of biasing potential 21 being provided if necessary.

If half-wave rectification only were used in the circuit of Fig. 3, that is if rectifier 5 and differentiation circuit 9 were omitted, the output of the sawtooth generator 15 would be a succession of sawteeth corresponding to the hatched triangles 22 in Fig. 1*d*, it being assumed that resistor 20 is sufficiently large and resistor 19 sufficiently small to result in substantially linear leading and trailing edges as shown. With the full wave rectification circuit described the number of sawteeth produced will be doubled, resulting in an output such as the hatched triangles 23 shown in Fig. 1*e*. Different circuit constants have been assumed in the two cases, in order to otbain waves of similar amplitude, yet it will be seen that in each instance the sawtooth wave produced will have an envelope 24 which is similar to the signal wave 1 of Fig. 1*a*.

In order to minimize distortion, I prefer to have the sawtooth generator 15 work into a class-A amplifier operating without grid current, shown in Fig. 4 as a triode 25. The signal corresponding to wave 1 of Fig. 1*a* may be detected by filtering out the high frequency component of wave 22 or 23 in a smoothing circuit 26, shown in Fig. 4 as comprising an amplifier 27 and a low-pass filter 28, and may be taken off a potentiometer 29 connected across the latter. For more efficient detection, however, a network consisting of a rectifier 30, a shunt resistor 31 and a condenser 32 may be inserted between the circuits 15 and 26. The effect of the insertion of such a network is as follows:

Since the rectifier 30 is arranged to offer a low resistance path to current passing from the condenser 32 through the triode 25, the potential on that condenser will reach a negative peak whenever the sawtooth wave 22 or 23 is at its maximum. At the end of each cycle, however, the negative charge on condenser 32 will be trapped and will be capable of leaking off at a reduced rate only by way of resistor 31 until, somewhere along the leading edge of the next sawtooth, the voltages on opposite terminals of the rectifier are again equal. There will thus develop across the load resistor 33 of amplifier 27 a voltage having a serrate wave form as shown at 34 in Figs. 1*d* and 1*e*, varying between values which define an upper envelope 24 and a lower envelope 35. The resulting mean voltage obtainable across potentiometer 29 will then lie substantially midway between these two envelopes, thus closely following the voltage variations represented by the envelope 24 of the original sawtooth wave.

If the rectifier 30 is of the dry contact type, the provision of a shunt resistor 31 may be unnecessary if the resistance of the rectifier to reverse current is of the desired magnitude.

The clipping and combining circuit 12 has been shown in Fig. 4 to comprise the vacuum tubes 36, 37 and 38 of which the first two are connected in push-pull and are biased, e. g. by battery 39, so as to pass signals above the lower clipping level 13′ only. These signals are inverted on reaching the tube 38, and the latter is biased (e. g. by battery 40) to a point corresponding to the level 13 in Fig. 3, thus applying the desired constant-amplitude pulses 14 to the grid of thyratron 16.

While I have described in the foregoing a sawtooth generator of the type in which a condenser discharges in well known manner through a thyratron, it will be appreciated that the invention is not limited to the use of this specific type of generator. In fact, if the input should be a carrier wave received via an antenna, it may be difficult if not impossible to design a thyratron or other gas discharge tube having a de-ionization time short enough to be suitable for any but the lowest radio frequencies. Sawtooth generators employing electronic rather than ionic discharge means are known and may be substituted for the generator 15 of Fig. 4, and in some instances it will be found convenient simply to replace the thyratron 16 by a normally non-conducting vacuum tube adapted to discharge during the presence of a trigger pulse 14.

A more positive-acting electronic sawtooth generator has been disclosed in Fig. 5*a*, designed to be inserted between the lines A—A of Fig. 4. This generator 15*a* comprises two multivibrator-coupled vacuum tubes 41 and 42 of which tube 41 is normally conducting. The grid of tube 42 is connected through a biasing battery 43 to the plate of tube 41, being held at such a potential as to cut off the current in tube 42 as long as tube 41 conducts. The grid of tube 41, on the other hand, is connected to the plate of tube 42 and is biased through battery 44 to a point which lies only slightly above cutoff in the non-conducting condition of tube 42. A control tube 45 has its cathode connected to that of tube 41 in series with a cathode resistor 46. A condenser 47 shunted by a resistor 48 is inserted in the cathode lead of tube 42 and the grid of an inverter tube 49 is connected to the cathode of tube 42. The tube 41 has a plate resistor 50 which is large enough to raise the grid voltage of tube 42 well above cut off when the former tube ceases to conduct, and the latter tube has a plate resistor 51 which is preferably just large enough to drive the grid of tube 41 beyond cutoff when the condenser 47 is charged through tube 42.

The operation of this sawtooth generator is as follows: In the absence of a synchronizing pulse on the grid of tube 45, tube 41 is normally conducting and tube 42 non-conducting. Under these conditions the condenser 47 may be assumed to be initially at ground potential which, for the purposes of the invention, is preferably arranged to be insufficient to overcome the bias on the grid of that tube. When a pulse such as 14 (Fig. 3) is applied to the grid of the control tube 45, the current surging through resistor 46 will momentarily raise the cathode potential of tube 41 to such a value that the latter tube ceases to conduct. This drives the grid of tube 42 positive with respect to its cutoff potential and the condenser 47 is charged through the tube and through resistor 51. The voltage drop across the latter resistor now serves to maintain the tube 41 in non-conducting condition until the charge on condenser 47 has built up sufficiently to reduce the current flow through resistor 51 to a value which will trip the multivibrator arrangement into normal condition. After this is done, and the tube 42 has ceased to conduct, condenser 47 will slowly discharge through resistor 48 to produce the leading edge of a sawtooth of negative polarity. The inverter tube 49 serves to transform the voltage thus developed across condenser 47 into a voltage substantially corresponding to that illustrated in Fig. 1*d* or 1*e*.

The resistor 51 should be small enough to permit a rapid charging of the condenser at the trailing edges of the sawtooth wave; thus the voltage swing on the anode of tube 42 will be necessarily limited. This voltage swing may, of course, be suitably amplified before being applied to the grid of tube 41.

In Fig. 5 I have illustrated a preferred embodiment of my invention, in which circuit elements corresponding to those shown in the preceding figures have been given the same reference numerals. The secondary of input transformer 3 feeds three rectifiers 4, 5 and 5′ in series with differentiation circuits 8, 9 and 9′ respectively. The circuits 8, 9 and 9′ are similar to the differentiation circuits 8 and 9 of Fig. 3 except for the fact that they also include clipping means to produce respective pulse trains 14, 14′ and 14″. Pulses 14 and 14′ are again of like polarity and are relatively displaced by 180 degrees, whereas the pulses 14″ occur simultaneously with pulses 14′ but are of the negative sign. Disregarding for the moment that part of the network which is associated with the rectifier 5 and differentiation circuit 9, one notes that the pulses 14 are again applied to a sawtooth generator 15 shown here as comprising a thyratron 16 and a condenser 17; the condenser is charged through a pentode 52 replacing the resistor 20 of Fig. 4. It is well known that in this manner a substantially constant charging current may be obtained. The output of sawtooth generator 15 is fed to one of the two grids of a tube 53 having its output circuit connected by way of a rectifier 54 to a further pentode 55 for a purpose presently to be described.

The pulses 14 are also received by the grid of a tube 56 while the grid of another tube 57 receives the pulses 14″ forming the output of differentiation circuit 9′. The tubes 56 and 57 have their plates connected to power supply 58 over a common anode resistor 59; the latter is connected over coupling condenser 60 to the grid of an amplifier 61 and over coupling condenser 62 to the grid of an inverter tube 63 serving, in turn, to apply the inverted voltage swing of resistor 59 to the input of an amplifier 61′ by way of its load resistor 64. Resistors 59 and/or 64 may be designed as potentiometers for the purpose of adjusting the relative amplitudes of the trigger pulses fed to the grids of tubes 61 and 61′. Thus the pulses received by the amplifier 61 will be alternately positive and negative and will be opposite in polarity to those simultaneously received by the amplifier 61′.

Amplifier tubes 61 and 61′ work into a gating circuit 65 which, in the embodiment illustrated, comprises two cold cathode tubes 66 and 66′. The tube 66 is connected across the output resistor 67 of amplifier 61 and is also in series with part of the power supply therefor, shown as a battery 68; similarly, tube 66′ is connected across a resistor 67′ and a battery 68′ associated with amplifier 61′. When a positive pulse is applied to the grid of amplifier tube 61, the voltage drop across resistor 67 counteracting the potential from battery 68 will rise momentarily so that the voltage across the cold cathode tube 66 will drop to the extinction point of that tube; at the same time the negative pulse arriving at the grid of amplifier 59′ will raise the potential across cold cathode tube 66′ sufficiently to light the latter. On the next half cycle the polarity of the trigger pulses is reversed so that tube 66 is again lit and tube 66′ is extinguished. It will be understood that in the ignited condition of either tube the anode voltage of the associated amplifier will be lower than when the tube is de-energized.

The plate of amplifier 61 is connected to the control grid of pentode 55 which, in the conducting condition of cold cathode tube 66, is biased beyond cutoff by means of a battery 69. The plate of amplifier 61′ is connected to the second of the two grids of tube 53 which, in the conducting condition of cold cathode tube 66′, is biased beyond cutoff by means of a battery 70. The generator 15 produces a single sawtooth per cycle, its leading edge extending practically through the entire time interval between consecutive pulses 14. It will be seen that during the first half of this interval the tube 66 is lit while the tube 66′ is extinguished which is the condition indicated in the drawing. Substantially in the middle of the cycle a negative pulse 14″ arrives at the grid of tube 57, reversing the condition of tubes 66 and 66′; thus during the second half of the cycle the tube 66 is de-energized while tube 66′ is ignited. From what has been said above it will further appear that during the first half of the cycle the tube 53 is conductive while pentode 55 is blocked; the opposite is true in the second half of the cycle.

The operation of the circuit so far described is as follows: During the first half of each cycle the voltage on the ungrounded terminal of the output resistor 71 of tube 53 will be increasingly negative as the leading edge of the sawtooth is applied to the first grid of that tube. At the same time the condenser 72 charges through the rectifier 54, its discharge path through pentode 55 being blocked by the negative potential on the control grid thereof. With the tripping of the gating circuit 65 the two-grid tube 53 finds itself suddenly cut off, and the condenser 72 discharges at a substantially linear rate through the now unblocked pentode 55. The rate of discharge of condenser 72 through pentode 55 should correspond, substantially, to the rate of charge of condenser 17 through pentode 52, and this latter rate may be adjusted by means of a potentiometer circuit 73. The resulting voltage across the condenser 72 is applied to the grid of a triode 74 and appears across the load resistor 75 thereof in a form illustrated by the graph *f* in Fig. 1; this voltage 76 will be seen to have an envelope 24 virtually identical with that of sawtooth wave 23 in Fig. 1*e*.

While I do not claim that the voltage curve 76 shown in Fig. 1*f*, taken by itself, has any particular advantages over the sawtooth wave 23 obtained, for example, by the arrangement of Fig. 4, I have found that an especially desirable wave form may be obtained by generating a second voltage of similar character, displacing it by 180 degrees relative to the first voltage, and combining the two voltages thus produced. The resultant voltage wave is a high fidelity reproduction of the original signal wave and does not require the use of smoothing circuits of large time constant for filtering out the high frequency components; this permits the detection of relatively sharp pulses even where the cadence and/or duration of such pulses is of the order of magnitude of the frequency and period, respectively, of the carrier wave.

Figure 2:
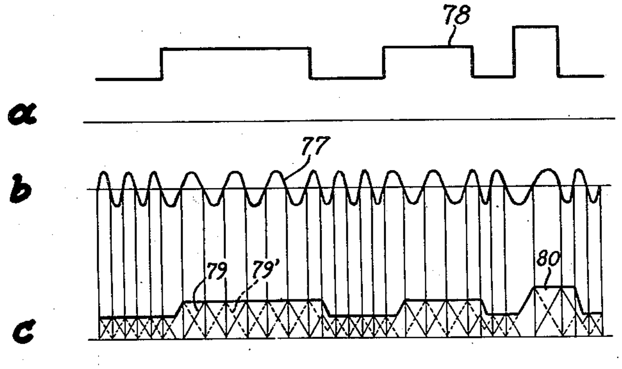
Fig. 2 is a similar graph illustrating a specific aspect of the invention.

As an illustration I have shown in Fig. 2 the reproduction of a signal wave consisting of a series of flat-topped pulses the spacing and duration of which is only slightly greater than the mean period of the frequency modulated carrier wave. The carrier wave 77 in Fig. 2*b* is frequency modulated by the signal 78 (graph *a*) and is subsequently demodulated in a discriminator operating on the principle of Fig. 5. The curve 79, shown in full lines at *c*, corresponds to the voltage wave shown in Fig. 1*f* and has an envelope which is too rich in harmonics to be detected, without considerable distortion, by conventional methods. In accordance with the method outlined above, however, I produce a second voltage wave 79′, shown in dotted lines, which is 180 degrees out of phase with respect to voltage wave 79. The next step is to combine the two voltages 79 and 79′. Because the leading edge of each cycle of wave 79 coincides with the trailing edge of each cycle of wave 79′ and vice versa, the two edges being substantially symmetrical, there results a voltage wave 80 which is a reasonable replica of the signal wave 78 and contains virtually no components of carrier frequency; this obviates the need for the conventional low pass filters and permits utilization of the voltage 80 without material distortion. It will be clear that the method just described will also work well with more complex wave forms and will be equally applicable to sinusoidal signals of the type shown in Fig. 1; in the latter case the resultant voltage wave will of course contain some high frequency components which, however, will generally consist of higher order harmonics of the basic or carrier frequency and may therefore be eliminated without noticeable distortion of the signal, in many cases by the various coupling circuits of the receiver without the aid of separate smoothing networks.

Returning now to the description of Fig. 5, I have shown there a circuit arrangement by which the method disclosed above may be carried into practice. The pulses 14′ from differentiation circuit 9′ are routed over an additional channel which comprises a sawtooth generator 15′ including a thyratron 16′, a charging condenser 17′, a pentode 52′ and a potentiometer circuit 73′; a two-grid tube 53′ having a load resistor 71′; a rectifier 54′; a voltage storing means in the form of a condenser 72′; and a pentode 55′. This channel is identical with the one feeding the triode 74 and its output is received by the grid of a triode 74′. The control grid of pentode 55′, however, is connected over a bias battery 69′ to the plate of amplifier 61′ while the second grid of the tube 53′ is connected by way of battery 70′ to the plate of amplifier 61. The sawtooth generator 15′ will be triggered by pulses 14′ which are displaced by 180 degrees with respect to the pulses 14, the latter serving to block the tube 53′ and unblock the pentode 55′, whereby a voltage representative of the instantaneous input frequency is registered on the condenser 72′. The combined output of triodes 74 and 74′ can be taken off at their common output resistor 75 and will be a voltage of the type described with reference to Fig. 2*c*.

The gas-filled cold cathode tubes 66 and 66′ of the gating circuit 65 may be replaced by high vacuum tubes in order to make the functioning of the circuit independent of de-ionization time; thus an alternative gating circuit of the multivabrator type is shown in Fig. 5*b* and is designed to be bodily inserted into the square B of Fig. 5. The gating circuit of Fig. 5*b* comprises two triodes 81 and 81′ connected to represent a non-self-oscillatory multivibrator having two stable conditions, the plate of tube 81 being connected to the grid of tube 81′ by way of a bias battery 82′ and the plate of tube 81′ being connected to the grid of tube 81 via a bias battery 82. The plate of tube 81′ is further connected to a conductor 83 leading to respective grids of pentode 55 and two-grid tube 53′ (Fig. 5), while the plate of tube 81 is connected to a conductor 83′ leading to respective grids of pentode 55′ and two-grid tube 53. Pulses from the output resistors 67 and 67′ are applied to the grids of tubes 81 and 81′, respectively.

When, with tube 81 conducting and tube 81′ cut off, a positive pulse arrives at the grid of the latter, a space current will start to flow through tube 81′ and reduce the anode potential thereof, thereby biasing tube 81 to cutoff which in turn will keep tube 81′ conducting. A subsequent negative pulse on the grid of that tube will restore the original condition in a manner well known in the multivibrator art. It is to be observed that each pulse applied to the grid of one tube is accompanied by a pulse of opposite polarity arriving at the grid of the other, which tends to increase the sensitivity of the multivibrator and to insure reliable operation. It will be understood, however, that with the arrangement of Fig. 5*b* only one train of alternating pulses is necessary to control the gating circuit and that in such a case one pulse channel of Fig. 5, e. g. tubes 63 and 61′, may be omitted. Other forms of gating circuits may likewise be substituted for the circuit 65 in Fig. 5, the example selected serving merely to illustrate the principle of the arrangement.

In similar manner as in Fig. 4 the sawtooth generator 15 (and 15′) of Fig. 5 may be replaced by a different type of generator such as the one shown in Fig. 5*a*, previously discussed. For greater linearity in the production of the leading edges of voltage waves such as 76, 79, 79′ one may also replace the resistor 48 in Fig. 5*a* with a constant current device such as pentode 52 in Fig. 5.

As a further refinement of the arrangement of Fig. 5, delay networks 84 and 84′ may be inserted in the channels of the gating pulses. It has been assumed above that the trailing edges of the sawtooth wave will be steep and these edges have been shown in Figs. 1 and 2 as having an angle of 90 degrees. In practice it will not always be possible to disregard the duration of these trailing edges and, in order to obtain perfect registration between the leading edge of each sawtooth produced by generators 15, 15′ and the periods during which tubes 53, 53′ are respectively conductive, the pulses applied to the grids of amplifiers 61, 61′ may be delayed for the time required by condenser 17, 17′ to discharge through the thyratron 16, 16′. In the case of substitution of sawtooth generator 15*a* (Fig. 5*a*) for either of those shown in Fig. 5, the delay introduced by networks 84, 84′ should cover the period during which condenser 47 is charged through resistor 51 and tube 42.

Utilizing the principle of triggering a sawtooth generator by a first set of pulses, e. g. positive pulses 14, and registering the instantaneous values of the generator voltage by a second set of pulses, e. g. negative pulses 14′, I may obtain through modifying the method used in Fig. 5 an output as shown in graph *g* of Fig. 1 which consists of a train of pulses varying in cadence as well as in amplitude with the frequency of the basic wave of graph *b*. Integration of the pulses 85 results in a voltage wave 86 which oscillates between two envelopes 87 and 88, each of these two envelopes being the inverted equivalent of the signal wave 1 which inversion, of course, is physically without significance. It is possible to make the voltage swing on both these envelopes substantially equal, as seen by the difference in amplitude which is similar at peaks $P_1$ and $P_2$, whereby the resulting mean voltage (after elimination of the high frequency component in a smoothing network) will be equivalent to the one derivable from sawtooth waves 22 or 23 (graphs *c* and *d*) but corresponding to a greater depth of modulation. An arrangement for obtaining the pulses 85 and the voltage wave 86 will now be described with reference to Fig. 6.

The input transformer 3, rectifiers 4 and 5, and differentiation circuits 8 and 9 are arranged in similar manner as in Fig. 3, and the output of circuits 8 and 9 again consists of pulse trains 10 and 11 relatively displaced by 180 degrees. Pulse train 10 is applied to a shaper and clipper 89 the output of which is a set of positive trigger pulses 14′ obtained by clipping between levels 13 and 13′ as before. Differentiation circuit 9 is connected to a shaper and clipper 90 which clips the pulses 11 between different levels, 91 and 91′, and transforms them into a train of substantially rectangular pulses 92 likewise of positive polarity. The leading edges of pulses 14′ and 92 follow one another at 180 degree intervals. Pulses 14′ are again used to trigger a sawtooth generator 15, including the thyratron 16 and condenser 17, which works into the suitably biased class-A amplifier 25. The output of amplifier 25 is fed to the first grid 93 of a vacuum tube 95 which is normally blocked by a negative potential on its second grid 94, the latter being connected to the shaper and clipper 90 for intermittent unblocking by the gating pulses 92. The amplifier 95 is coupled to triode 27 over a network which comprises a rectifier 30, shunt resistor 31 and signal storing condenser 32. A smoothing circuit 96 is connected in the output circuit of triode 27.

The elements 30, 31 and 32 are arranged in similar manner as in Fig. 4, but the time constant of the discharge path represented by resistors 31 and 97 should be such that the condenser 32 discharges at a highly non-linear rate. In Fig. 1*g*, which illustrates the output voltage of tube 27 in Fig. 6, the dotted line 98 represents a voltage corresponding to the sawtooth wave produced by generator 15; the impulses 85 are part of the amplified gating pulses 92 during which tube 95 is unblocked, permitting the voltage across resistor 97 to rise to a value determined by the inverted sawtooth voltage on grid 93. On account of the negligible resistance of rectifier 30, this voltage drop is registered virtually instantaneously on condenser 32 and appears in the output of tube 27 as the leading edge of voltage wave 86. As the voltage across resistor 97 continues to rise, the negative charge on condenser 32 leaks off through resistors 31 and 97 along an exponential curve.

The inversion of the sawtooth wave 98 with respect to the polarity of the gating pulses 85, as seen in Fig. 1*g*, results in the spacing of pulses 85 being narrower at large amplitudes, and vice versa. Since the rate of discharge of condenser 32 will be greater with higher potentials built up thereon, and since the time of discharge will be reduced by shorter intervals between pulses, it follows that the potential drop between pulses may be adjusted to be substantially the same at all amplitude levels. This results in the previously discussed similarity between the envelopes 87 and 88.

It is believed that the comparatively simple discriminator of Fig. 6 will be found particularly useful in connection with voice frequency signalling systems in telecommunication circuits, and such an arrangement has been shown in Fig. 7. Here the input transformer 3 is seen connected across a transmission line 99 and works into a network similar to that shown between lines C—C and D—D in Fig. 6. The pulses 14′ again serve to trigger the sawtooth generator 15 feeding amplifier 25, followed by an inverter stage 100. The condenser 32 is charged through a triode 101, taking the place of rectifier 30, which is unblocked only when pulses 92 are applied to its grid. A discharge path for condenser 32 is provided in the form of a vacuum tube 102 which will have a finite internal resistance when the potential across condenser 17, connected to its grid by way of a battery 103, reaches its full value but which will be cut off as long as pulses in rapid succession are applied to the thyratron 16. Condenser 32 is again connected to the grid of a triode 27, operating as class-A amplifier without grid current, from whose plate resistor 33 the output is obtained.

Assuming that a substantially pure sine wave of constant frequency is applied to the transformer 3, there will be built up on condenser 32 a potential determined by the frequency of the wave, higher potentials corresponding to higher frequencies. Whatever leakage path exists will have the same effect as resistors 31 and 97 in Fig. 6, namely, to cause a certain voltage swing between pulses which will be substantially independent of the absolute value of the potential across the condenser. After the signal has ended, the voltage on condenser 17 will rise to its maximum, thereby overcoming the bias of battery 103 to unblock tube 102 for a quick discharge of condenser 32.

The output voltage obtained across resistor 33, or a fraction thereof, may be applied to a pair of deflecting electrodes of a cathode ray tube 104 provided with a plurality of targets 105, each connected to a respective load 106 which may be a relay, an amplifier, or some other responsive device. This device may be slightly slow-acting in order to result in its energization only after the beam of the cathode ray tube has come to rest on the associated target 105 for a sufficiently long period to prevent false operation due to transient voltages.

Since the leakage resistance across the condenser 32 is kept high, the voltage on the condenser will fluctuate within narrow limits only after having reached the value corresponding to the frequency of the signal wave and the targets 105 can be made relatively narrow, so that a large number thereof might be accommodated on the screen of the cathode ray tube. It should be noted that such an arrangement affords sharp discrimination against input signals which are not a pure sine wave since, if harmonics or other frequencies of appreciable amplitude are present, trigger and gating pulses will follow one another in irregular succession and will result in abnormally high voltages reaching condenser 32, deflecting the beam of the cathode ray tube 104 to an inoperative position. Thus it will be seen that energization of a desired load 106 will be possible only if a suitable frequency, substantially unaccompanied by harmonics or other interfering frequencies, is applied to the transformer 3 for a predetermined time and is preceded by a signal pause of sufficient duration to insure the discharge of condenser 32 by way of tube 102.

In cases where it is unnecessary or undesirable to have such a sharp discrimination, a discharge path similar to resistors 31 and 97 (Fig. 6) may be provided, and a filter network (not shown) may be inserted between the output resistor 33 and the cathode ray tube 104 to derive a steady voltage from the oscillating potential built up on condenser 32.

In voice frequency signaling it is known to safeguard against false operation by the simultaneous transmission of a plurality of different frequencies. Such additional safeguards may be utilized in the system of Fig. 7 by providing a signal channel which comprises a band pass filter 107 and a rectifier 108, the latter being connected to the normally blocked control electrode 109 of cathode ray tube 104. The band pass filter 107 may be tuned to a single frequency $f$, and a band stop filter 110 may be provided in series with the transformer 3. Filter 110 eliminates the frequency $f$ but passes a frequency band F which does not include $f$. Thus a given frequency within band F will tend to deflect the beam of tube 104 so as to make it impinge on a particular target 105, but the beam will be cut off unless a signal at frequency $f$ is applied to the band pass filter 107 at the same time. Many modifications of this arrangement are possible; for instance the output of rectifier 108 may be applied to a second set of deflecting electrodes rather than to the control electrode 109.

Utilizing the principles explained in connection with the preceding figures, Fig. 8 shows an arrangement for detecting code signals transmitted by means of two carrier waves. A first carrier frequency, $F_1$, is modulated by any of five audio frequencies $f_1$, $f_2$, $f_3$, $f_4$ and $f_5$; a second carrier frequency, $F_2$, is modulated by the same audio frequencies $f_1$ through $f_5$. The modulated carrier waves are received over an antena 111 by a receiver 112 and are separated by two band pass filters 113 and 114. Filter 113 works into an amplifier and mixer 115 connected to a local oscillator 116 of frequency $F_1$; similarly, filter 114 works into an amplifier and mixer 117 connected to a local oscillator 118 of frequency $F_2$. Band pass filters 119 and 120 select from the outputs of mixers 115 and 116, respectively, the frequency band which includes the audio frequencies $f_1$ through $f_5$, and are connected to associated frequency discriminators 121 and 122 preferably of the type shown in Fig. 6 or Fig. 7. The direct current potential from the output of frequency discriminator 121 is applied to the vertical deflecting electrode 123 of a cathode ray tube, and the direct current potential from the output of frequency discriminator 122 is applied to the horizontal deflecting electrode 124 of the same tube. The other horizontal and vertical deflecting electrodes are grounded at 125. The cathode ray tube is provided with twenty-five targets 127, connected to associated loads (not shown) in the manner described in connection with Fig. 7.

With this arrangement any of twenty-five devices connected to respective targets 127 may be actuated by the simultaneous transmission of two frequencies over carrier $F_1$ and $F_2$, there being twenty-five combinations of frequencies $f_1$ through $f_5$. For example, each of the twenty-five devices may be arranged to display a particular letter or message, or the number of targets could be increased, say, to sixty-four (corresponding to eight different audio frequencies) and they could be connected to actuate respective keys of a teleprinter. Secret code messages, using "dummy" combinations interspersed with significant ones, could be received and demodulated by the arrangement shown in Fig. 8.

Fig. 9 shows part of a switching arrangement for automatic telephone exchanges, utilizing the principles of the invention. The primary of transformer 3 is connected across a line circuit (not shown) in which, it is assumed, means (e. g. respective vibratory members) are provided for opening the circuit for a brief period the duration of which is representative of a digit selected. The manner in which this is done has no bearing on the present invention. At 128 there is shown the current flowing through the primary of transformer 3, and at 129 are shown the pulses which interruption of this current produces in the secondary of the transformer. Rectifiers 4 and 5′ select, respectively, the positive and negative elements of pulse train 129 and apply them to clippers 130 and 131 the respective outputs of which are shown at 132 and 133. A sawtooth generator 15, triggered by pulses 132 which correspond to pulses 14 of the preceding embodiments, works into an amplifier 100 which charges a condenser 32 by way of a triode 101. Further connected to the output of clipper 130 is a normally cut-off vacuum tube 134 having a thyratron 135 connected across its output resistor 136 and plate supply 137. With the thyratron 135 conducting, a positive pulse 132 applied to the grid of tube 134 will lower the voltage across resistor 136 sufficiently to de-ionize the tube 135. The negative pulses 133 are inverted at 138 and are applied to the grid of thyratron 135 to re-ignite the same in an obvious manner.

The control grid of tube 101 is connected to the plates of tubes 134 and 135. After conduction through both tubes has ceased, their plate voltage will be sufficiently high to overcome the bias of a battery 139, thereby rendering triode 101 conducting. In this condition the condenser 32 will be charged with an increasingly negative potential until the occurrence of pulse 133 opens its charging circuit at the grid of tube 101. Thus the potential on condenser 32 will be determined by the interval between pulses 132 and 133 and may be applied to an amplifier 140, which should be of a type operating without grid current, in order to effect a desired switching operation in any known and appropriate manner; preferably a slow-acting peak responsive device is used to prevent premature operation.

A discharge path for the condenser 32 is provided in the form of a switch 141, which may be the armature of a relay (not shown); it will be understood that the relay may be actuated in known fashion to close this contact after the desired switching operation has been performed, and to reopen it preparatory to the reception of a further signal.

The application of the invention to phase discriminating systems will be described with reference to Figs. 10, 11 and 12 of the drawing.

A close relationship exists between phase and frequency modulated waves. This relationship may be expressed thus that where a frequency discriminator is adapted to demodulate a frequency modulated carrier wave so as to reproduce a signal giving rise to the modulation, the same discriminator will reproduce the derivative of that signal if used to demodulate a carrier wave which has been phase modulated with the same signal. Hence if the modulating voltage be A sin $(pt)$, $p$ being the signal frequency, the output of the frequency discriminator will be $pA \cos (pt)$ if the signal is transmitted by phase modulation. Thus the amplitude of the demodulation products vary with frequency for a given signal amplitude. It has already been proposed to convert a frequency discriminator into a phase discriminator by inserting therein a network adapted to produce an output wherein the amplitudes vary inversely with frequency. This method fails, however, where the signal frequencies range to very low values since, as the modulating frequency approaches zero, the amplification factor of the network would have to rise toward infinity.

Stated more generally, if the signal voltage is of the form $f(pt)$, the output of the frequency discriminator in response to a phase modulated input wave will be a voltage of the form $pf'(pt)$. To obtain the original signal it would be necessary to integrate this voltage over a sufficiently long period of time to allow reproduction of comparatively slow fluctuations of the signal voltage without undue distortion. This is illustrated in Fig. 10, where the graph *a* shows a signal wave 142 oscillating at long intervals about a mean voltage 143.

The phase modulated carrier wave corresponding to the signal 142 is shown in the graph *b* as a wave 144 of constant amplitude. There is also shown for comparison, in dotted lines, an unmodulated wave 145 of constant amplitude and frequency, the latter corresponding to the average frequency of the phase modulated wave 144. It will be noted that the frequency of wave 144 remains constant whenever the signal 142 has a constant amplitude, and that wave 144 leads the reference wave 145 in proportion to the deviation of the signal voltage from a reference voltage indicated at 146.

A change in the voltage 142, on the other hand, is reflected in a variation in the frequency of carrier wave 144 as may be seen from graph *b*. By applying this wave to a frequency discriminator of the type disclosed hereinabove, one may obtain a sawtooth voltage 147 having an envelope 148. The envelope 148 may be detected by any of the methods described; this envelope shows little similarity with the signal wave 142, approximating instead the derivative of that curve. As will be seen from graph *c*, negative amplitudes of wave 148 correspond to negative slopes of voltage 142, positive amplitudes corresponding to positive slopes. The polarity is of course quite arbitrary.

To obtain the original signal I integrate the curve 148 over a large period of time by applying the wave 148 to a suitable storing device, such as a condenser having high leakage resistance, in such a manner that amplitudes of one polarity will have a cumulative effect while those of opposite polarity will cancel. The resultant voltage is shown in graph *e* as a curve 142'. It should be noted that, because of the finite leakage resistance, the mean value of this voltage shown at 143' will gradually approach and finally merge with the zero voltage line 146' so that the detected signal will ultimately be balanced with respect to ground. This is shown in graph *f* where it is assumed that the signal 142 has been repeated a second time in its original form, wave 142'' following immediately upon wave 142' as a reproduction of the repeated signal.

It will be appreciated that the specific wave form shown in Fig. 10*a* is a rather extreme type of signal, selected to prove that the method outlined above will be effective even where the modulating frequency varies between zero and relatively high values. A certain amount of distortion, manifesting itself in rounded corners and sloping pulse tops, is unavoidable in such cases but for most practical purposes the output voltage 142', 142'' will represent a sufficiently faithful reproduction of the signal. More nearly sinusoidal signal voltages will be detectable with a lesser degree of distortion.

Fig. 11 is a circuit arrangement for detecting phase modulated waves in accordance with the method just described. The phase modulated waves are received over antenna 149 by a receiver 150 and are frequency demodulated in a discriminator 151 which may be of the type discussed in connection with Fig. 5. Frequency discriminator 151 is coupled to an amplifier 152 having its grid suitably biased by a potentiometer circuit 153. Resistors 154 and 155 are connected in the plate circuit of amplifier 152 so as to give a balanced output, positive voltages being taken off resistor 155 and negative voltages off resistor 154. There is further provided a similar amplifier 156 having two output resistors 157 and 158, for negative and positive voltages respectively. Amplifier 156 has two control grids, the grid 159 being connected to a potentiometer circuit 160 and the other grid 161 being connected to a source of corrective voltage presently to be described. A variable tap on resistor 157 is connected to the grid of a triode 162, the cathode of which is connected to a variable tap on resistor 154; similarly, a variable tap on resistor 158 is connected to the grid of a triode 163, the cathode of which is connected to a variable tap on resistor 155. The output of tubes 162 and 163 is taken off respective load resistors 164 and 165 and is applied to the integrating network 166.

The network 166 comprises a condenser 167 in series with a pair of charging resistors 168 and 169. Condenser 167 is adapted to be charged in one sense through a pair of tandem-connected vacuum tubes 170 and 171, and to be discharged (or charged in the opposite sense) through a pair of tandem-connected vacuum tubes 172 and 173. Tubes 170 and 172 are provided with two control grids each, while tubes 171 and 173 have been shown as triodes. The grid of tube 171 and one of the grids of tube 170 are connected to output resistor 164; similarly, the grid of tube 173 and one of the grids of tube 172 are connected to output resistor 165.

Considering the circuit arrangement so far described, the following preliminary adjustments may be made: Potentiometer circuits 153 and 160 are adjusted so that a certain rest current flows through the associated tubes 152 and 156; the taps on resistors 157 and 158 are positioned symmetrically with respect to ground, and the taps on resistors 154 and 155 are set so that tubes 162 and 163 will operate at a desired point of their characteristics. Tubes 170, 171, 172 and 173 are biased to cutoff, as by the suitable adjustment of potentiometers 164 and 165. The coupling between frequency discriminator 151 and amplifier 152 includes a blocking condenser 174 designed to keep off long-range voltage variations due to drifts in carrier frequency. Negative voltage deviations from the normal or mean amplitude will render tube 162 less conductive, resulting in turn in the energization of tubes 170 and 171 to permit a charging current to flow into condenser 167; negative impulses on the grid of amplifier 152 will therefore tend to make the right-hand terminal of the condenser, as viewed in the drawing, more negative than the left-hand terminal thereof. Positive voltage deviations will result in the energization of tubes 172 and 173 and will have the tendency of making the right-hand terminal of the condenser more positive than the left-hand terminal. In order to balance the condenser 167 with respect to ground, and to prevent the accumulation of stray charges on the plates thereof, a very large resistance 175 is connected across the terminals of the condenser and is grounded at the center as shown at 176.

It will be observed that, if the leakage path through resistor 175 be disregarded, a charge accumulated during a period of conductivity of tubes 170 and 171 will only be dissipated during a similar period of conductivity of tubes 172 and 173; hence the integrating circuit will operate in the accumulative manner previously set forth.

One difficulty, however, resides in the fact that any existing charge on the condenser, due to input voltages of a certain polarity, will modify the bias of tubes 170 and 172 in such a manner as to reduce the sensitivity of the network to further voltages of the same polarity, favoring instead a quick dissipation of the existing charge. I overcome this difficulty by providing two amplifier tubes 177 and 178 having input connections to the cathode of a respective one of the aforesaid tubes 170, 172 and having output connections to the second control grid of the respectively other tube. Thus the grid of tube 177 is connected to the left-hand terminal of resistor 168, the output resistor 179 of that tube being connected to the second control grid of tube 172; similarly, the grid of tube 178 is connected to the right-hand terminal of resistor 169, the output resistor 180 of that tube being connected to the second control grid of tube 170. The magnitude of the bias applied in this manner to one grid of a tube, say 170, as a result of a voltage drop (or rise) on the outer terminal of resistor 169 is selected so as substantially to compensate for the bias applied to the other grid of this tube as a result of the corresponding voltage rise (or drop) on the outer terminal of resistor 168.

The voltage built up across condenser 167 is then applied to an unbalanced amplifier 181, comprising a pair of triodes 182 and 183 whose grids are connected to respective terminals of the condenser. Amplifier 181 operates in the manner of a cathode follower arrangement, the plate of tube 182 being connected to a point of fixed potential represented by the grounded battery 184. Individual plate resistors 185, 186 are in series with a cathode resistor 187 common to both tubes, this latter resistor being in series with a source of power shown as a battery 188. Output conductors 189 and 190 are connected to ground and to the plate of tube 183, respectively; the potential difference between these two conductors will equal the difference in the voltage drop across resistors 185 and 186.

With the arrangement shown it might still occur, even with careful design of the circuits, that a charge tends to build up on the condenser 167 due to a possible unbalance of the integrating network 166, taking the form of a unidirectional voltage superimposed upon the signal voltages. To meet this eventuality, the output conductor 190 may be connected to the grid of a vacuum tube 191 having a network 192, of large time constant, connected across its output circuit. The network 192 may comprise a potentiometer 193 and a bypass condenser 194, and its output may be used as the corrective voltage applied to the grid 161 of tube 156. Observation of the circuit arrangement will show that a preponderance of positive voltages on the grid of 183, which may be due to excessive activity of the pair of tubes 172, 173, will result in the application of a positive corrective voltage to grid 161 of tube 156, thereby increasing both the negative voltage obtainable from resistor 157 and the positive voltage obtainable from resistor 158. This will have the effect of lowering the grid voltage of tube 162 and raising the grid voltage of tube 163 resulting, in turn, in an increased effectiveness of tubes 170, 171 as against prolonged periods of inactivity of the other two tubes, thus tending to restore the balance. The inverse effect will be obtained when the prevailing voltage across the condenser 167 is of the opposite polarity.

It will be seen that tubes 170, 171, 172 and 173 constitute, effectively, a Wheatstone bridge and that consequently the operating point of these tubes need not be at cutoff provided the currents through these tubes under zero signal condition are properly balanced. The various adjustable resistances associated with tubes 152 and 156 permit further refinements of operation which will be described with reference to Fig. 12.

In this figure, the graph *a* again shows a voltage curve of arbitrary shape, designated 195, which may be the output of the frequency discriminator 151. With the taps on resistors 157 and 158 balanced to ground, as previously noted, current will flow through the tubes 172, 173 during periods of positive input voltages and through tubes 170, 171 during periods of negative voltages. Fig. 12*b* shows at 195′ the oscillations of the grid bias of tube 162 around its normal value, determining periods of conductivity for tubes 170 and 171 as shown by the shaded areas 196′; similarly, in graph *c*, there is shown at 195″ the input voltage to tube 163 which determines areas 196″ complementary to 196′, denoting periods of conductivity of tubes 172 and 173.

If, however, the ganged taps on resistors 157 and 158 are displaced downward as viewed in the drawing, current will flow through both of these pairs of tubes during periods greater than those indicated above, as seen in graps *d* and *e*. The input voltages to tubes 162 and 163 are shown at 197′ and 197″, respectively, subtending partially overlapping areas 198′ and 198″ to indicate periods during which charges are built up on condenser 167. The integrating network 166 serves as a means for effectively combining, in opposite phase, the input voltages 197′ and 197″ applied to tubes 162 and 163; this effect has been illustrated in graph *f*. Between the limits 199′ and 199″ the two voltages oppose each other and partially cancel, the net effect of voltages corresponding to zero signal input being zero as shown between ordinates O′ and O″. The curve 200 denotes the apparent input voltages, i. e., the voltage that would give the same effect if tubes 162 and 163 were operated as indicated in graphs *b* and *c*, and by comparison between curves 200 and 195 it will be seen that the lower amplitudes of the signal have been amplified. This effect is substantially opposite to that introduced by the non-linear distortion of vacuum tubes, and may consequently be utilized to counteract the distortion resulting from lower-bend operation of the tubes of the integrating network.

While I have described certain preferred embodiments of my invention, it should be distinctly understood that the arrangements shown are capable of further modification and that the principles of the invention may be utilized in a number of ways without departure from the spirit and scope of the invention as defined in the appended claims.

I claim:

1. In an automatic switching arrangement, an input circuit, a differentiation circuit coupled to said input circuit, means including said differentiation circuit for transforming a change in current in said input circuit into a first pulse, a normally inactive sawtooth generator adapted to be triggered by said first pulse, a condenser, means for charging said condenser from the output of said sawtooth generator, means including said differentiation circuit for transforming a subsequent change in current in said input circuit into a second pulse, means responsive to said second pulse for blocking said charging means, and output means connected across said condenser.

2. A receiver for detecting substantially pure sine waves, comprising an input circuit adapted to receive waves of different frequencies, means for deriving from said input circuit a first train of pulses having a cadence corresponding to the frequency of said waves, a relaxation oscillator responsive to said pulses, means for inverting the output of said oscillator so as to produce a sawtooth wave characterized by decreasing voltages during the leading edge of each sawtooth, a condenser, a normally blocked charging circuit coupling said condenser to the output of said inverting means, means for deriving from said input circuit a second train of pulses having a cadence corresponding to the frequency of said waves but occurring half a cycle after said first pulses, means for unblocking said charging circuit during the occurrence of any of said second pulses, a discharge circuit of high impedance for said condenser, and an output circuit of high impedance connected across said condenser.

3. A receiver as set forth in claim 2, wherein said output circuit includes a cathode ray tube having a plurality of targets disposed in the path of its beam, a plurality of responsive devices connected in series with respective targets, and means for applying the potential of said condenser to a pair of deflecting electrodes of said cathode ray tube.

4. A receiver as set forth in claim 3, further comprising means for normally blocking operation of said tube, means for inactivating said blocking means in response to a wave of predetermined frequency, and means for suppressing said frequency in the input circuit of said relaxation oscillator.

5. In a receiver for phase modulated waves, an input circuit, means for deriving from said input circuit a potential representative of the instantaneous frequency of said waves, means for comparing said potential with a predetermined normal potential, a condenser, electronic discharge means adapted to apply a voltage of one polarity across said condenser in response to positive deviations of said potential from said normal potential, electronic discharge means adapted to apply a voltage of opposite polarity across said condenser in response to negative deviations of said potential from said normal potential, and an output circuit connected across said condenser.

6. A receiver as set forth in claim 5, further comprising means for modifying the bias of said electronic discharge means in response to changes in the charge of said condenser.

7. The method of detecting wave-length modulated electric waves which comprises the steps of deriving spaced pulses from an integral number of half-cycles of said waves, producing a substantially triangular wave of the type wherein each cycle has a leading edge of predetermined slope and a trailing edge of predetermined slope returning to a base line, synchronizing the beginning of each trailing edge with a respective one of said pulses, and amplitude-detecting said triangular wave.

8. The method of detecting wave-length modulated electric waves which comprises the steps of deriving alternating first and second pulses from successive half-cycles of said wave, producing a first substantially triangular wave of the type wherein each cycle has a leading edge of predetermined slope and a trailing edge of a slope which is substantially the inverse of the slope of the leading edge, producing a second wave similar to said first triangular wave, synchronizing the beginning of each leading edge of said first wave with a respective one of said first pulses and the beginning of each trailing edge of said first wave with a respective one of said second pulses, synchronizing the beginning of each leading edge of said second wave with a respective one of said second pulses and the beginning of each trailing edge of said second wave with a respective one of said first pulses, and combining said first and second waves.

9. In a receiver for wave-length modulated electric waves, in combination, an input circuit, circuit means in said input circuit for deriving from an incoming wave a train of first pulses and a train of second pulses interleaved with said first pulse train, the spacing between successive pulses varying with the frequency of the incoming wave, a condenser, charging means for said condenser, discharging means for said condenser, a gating circuit adapted to operate in a first mode in response to pulses of said first train and to operate in a second mode in response to pulses of said second train, circuit means for controlling the operation of said charging and discharging means so as to render said charging means effective upon said gating circuit operating in its first mode and to render said discharging means effective upon said gating circuit operating in its second mode, and output means connected across said condenser.

10. The combination according to claim 9 wherein said charging and discharging means are arranged to charge and discharge, respectively, said condenser at substantially the same rate, further comprising a second condenser, second charging and discharging means for said second condenser similar to the first-mentioned charging and discharging means, respectively, and circuit means for controlling the operation of said second charging and discharging means so as to render said second charging means effective upon said gating circuit operating in its second mode and to render said second discharging means effective upon said gating circuit operating in its first mode, said output means comprising circuit means for combining the voltages developed across said two condensers.

11. A receiver as set forth in claim 2, further comprising blocking means in said discharge circuit for making the impedance thereof substantially infinite during operation of said oscillator, and a control circuit for inactivating said blocking means upon the return of said oscillator to an inactive condition.

12. A circuit arrangement for demodulating wave-length modulated electric waves, comprising a normally inactive sawtooth generator, an input circuit, differentiation means in said input circuit for deriving a tran of puleses from an incoming wave, the spacing of said pulses varying with the frequency of said wave, a trigger circuit for applying said pulses to said generator so as to render the same operative in response thereto, a condenser, circuit means for applying the output of said generator to said condenser, and an output circuit connected across said condenser.

13. A circuit arrangement according to claim 12 wherein said output circuit contains a smoothing network.

14. A circuit arrangement according to claim 12 wherein said circuit means include a charging circuit, rectifier means in said charging circuit offering low impedance to charging currents, and a high-impedance discharge circuit for said condenser.

15. A circuit arrangement according to claim 14 wherein said discharge circuit includes variable impedance means having a maximum impedance of substantially infinite value, and a control circuit including said differentiation means for modifying the value of said impedance in response to said pulses.

16. In a receiver for wave-length modulated electric waves, in combination, a normally inactive sawtooth generator adapted to produce successive cycles of a sawtooth wave in response to respective trigger pulses, first circuit means for deriving said trigger pulses from an incoming wave, second circuit means for applying said trigger pulses to said saw-tooth generator, and third circuit means for amplitude detecting the output of said sawtooth generator, said third circuit means including a condenser, a path of low impedance for charging said condenser, and a path of high imepedance for discharging said condenser.

KARL F. ROSS.

REFERENCES CITED

The following references are of record in the file of this patent:

UNITED STATES PATENTS

| Number | Name | Date |
|---|---|---|
| 2,086,918 | Luck | July 13, 1937 |
| 2,241,078 | Vreland | May 6, 1941 |
| 2,241,256 | Grould | May 6, 1941 |
| 2,254,031 | Faudell | Aug. 25, 1941 |
| 2,302,852 | Goddard | Nov. 24, 1942 |
| 2,374,746 | Hansell | May 1, 1945 |
| 2,379,055 | Abraham | June 26, 1945 |
| 2,380,982 | Mitchell | Aug. 7, 1945 |
| 2,381,928 | Roberts | Aug. 14, 1945 |
| 2,416,305 | Grieg | Feb. 25, 1947 |
| 2,416,306 | Grieg | Feb. 25, 1947 |
| 2,417,717 | Tellier | Mar. 18, 1947 |
| 2,425,066 | Labin et al. | Aug. 5, 1947 |
| 2,434,264 | Edson | Jan. 13, 1948 |
| 2,441,957 | DeRosa | May 25, 1948 |